US011757684B2

(12) United States Patent
Chang et al.

(10) Patent No.: US 11,757,684 B2
(45) Date of Patent: Sep. 12, 2023

(54) RETIMING CIRCUIT MODULE, SIGNAL TRANSMISSION SYSTEM, AND SIGNAL TRANSMISSION METHOD

(71) Applicant: PHISON ELECTRONICS CORP., Miaoli (TW)

(72) Inventors: Chun-Wei Chang, Nantou County (TW); Ching-Jui Hsiao, Miaoli County (TW); Jen-Chu Wu, New Taipei (TW); Yuwei Kuo, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 17/543,741

(22) Filed: Dec. 7, 2021

(65) Prior Publication Data

US 2023/0164008 A1    May 25, 2023

(30) Foreign Application Priority Data

Nov. 19, 2021    (TW) .................................. 110143270

(51) Int. Cl.
  *H04L 25/49*    (2006.01)
(52) U.S. Cl.
  CPC ................................ *H04L 25/4904* (2013.01)
(58) Field of Classification Search
  CPC ................................................. H04L 25/4904
  See application file for complete search history.

(56) References Cited

FOREIGN PATENT DOCUMENTS

| CN | 111193525 | 5/2020 | | |
|---|---|---|---|---|
| WO | 2020133537 | 7/2020 | | |
| WO | WO 2020/133537 | * 7/2020 | ............. | H03L 7/181 |
| WO | 2021147005 | 7/2021 | | |

OTHER PUBLICATIONS

"Office Action of Taiwan Counterpart Application", dated Jul. 26, 2022, p. 1-p. 6.

* cited by examiner

*Primary Examiner* — Nader Bolourchi
(74) *Attorney, Agent, or Firm* — JCIPRNET (57) ABSTRACT

A retiming circuit module, a signal transmission system, and a signal transmission method are provided. The retiming circuit module includes a path control circuit and a multipath signal transmission circuit. The multipath signal transmission circuit includes built-in first signal transmission path and second signal transmission path. The multipath signal transmission circuit may perform first signal transmission between an upstream device and a downstream device based on a first signal transmission frequency and the second signal transmission path. During a period of performing the first signal transmission, the path control circuit may detect a first data sequence transmitted between the upstream device and the downstream device. The path control circuit may control the multipath signal transmission circuit to switch to perform second signal transmission between the upstream device and the downstream device based on the first signal transmission frequency and the first signal transmission path according to the first data sequence.

27 Claims, 4 Drawing Sheets

RETIMING CIRCUIT MODULE, SIGNAL TRANSMISSION SYSTEM, AND SIGNAL TRANSMISSION METHOD

CROSS-REFERENCE TO RELATED APPLICATION

This application claims the priority benefit of Taiwan application serial no. 110143270, filed on Nov. 19, 2021. The entirety of the above-mentioned patent application is hereby incorporated by reference herein and made a part of this specification.

BACKGROUND

Technical Field

The disclosure relates to a signal transmission circuit, and particularly relates to a retiming circuit module, a signal transmission system, and a signal transmission method.

Description of Related Art

As the signal transmission speed on the printed circuit board becomes faster and faster, the signal attenuation during the transmission process becomes more and more serious. Therefore, in practice, a retimer is often added between an upstream component and a downstream component to extend a signal transmission distance. However, although adding a retimer to a signal transmission path can extend the signal transmission distance, a delay time of data transmission is increased accordingly. In addition, during a period of adjusting a signal transmission frequency, an equalizer circuit at a signal receiving end also takes a while to calibrate. Therefore, how to improve the equalizer calibration efficiency at a signal receiving end during the period of adjusting the signal transmission frequency is indeed one of the topics that persons skilled in the art are devoted to research on.

SUMMARY

The disclosure provides a retiming circuit module, a signal transmission system, and a signal transmission method, which can improve the equalizer calibration efficiency at a signal receiving end during a period of adjusting a signal transmission frequency.

An exemplary embodiment of the disclosure provides a retiming circuit module, which is adapted to perform signal transmission between an upstream device and a downstream device. The retiming circuit module includes a path control circuit and a multipath signal transmission circuit. The multipath signal transmission circuit is coupled to the path control circuit. The multipath signal transmission circuit has built-in first signal transmission path and second signal transmission path. The multipath signal transmission circuit is configured to perform first signal transmission between the upstream device and the downstream device based on a first signal transmission frequency and the second signal transmission path. During a period of performing the first signal transmission, the path control circuit is configured to detect a first data sequence transmitted between the upstream device and the downstream device. The path control circuit is further configured to control the multipath signal transmission circuit to switch to perform second signal transmission between the upstream device and the downstream device based on the first signal transmission frequency and the first signal transmission path according to the first data sequence.

An exemplary embodiment of the disclosure further provides a signal transmission system, which includes an upstream device, a downstream device, and a retiming circuit module. The retiming circuit module is coupled between the upstream device and the downstream device to perform signal transmission between the upstream device and the downstream device. The retiming circuit module includes multiple signal transmission paths. The retiming circuit module is configured to perform first signal transmission between the upstream device and the downstream device based on a first signal transmission frequency and a second signal transmission path among the signal transmission paths. During a period of performing the first signal transmission, the retiming circuit module is further configured to detect a first data sequence transmitted between the upstream device and the downstream device. The retiming circuit module is further configured to switch to perform second signal transmission between the upstream device and the downstream device based on the first signal transmission frequency and a first signal transmission path among the signal transmission paths according to the first data sequence.

An exemplary embodiment of the disclosure further provides a signal transmission method for a retiming circuit module. The signal transmission method includes the following steps. First signal transmission between an upstream device and a downstream device is performed based on a first signal transmission frequency and a second signal transmission path among multiple signal transmission paths of the retiming circuit module. During a period of performing the first signal transmission, a first data sequence transmitted between the upstream device and the downstream device is detected. Second signal transmission between the upstream device and the downstream device is switched to be performed based on the first signal transmission frequency and a first signal transmission path among the signal transmission paths according to the first data sequence.

Based on the above, the retiming circuit module may perform the first signal transmission between the upstream device and the downstream device based on the first signal transmission frequency and the second signal transmission path among the signal transmission paths. During the period of performing the first signal transmission, the retiming circuit module may detect the first data sequence transmitted between the upstream device and the downstream device. According to the first data sequence, the retiming circuit module may switch to perform the second signal transmission between the upstream device and the downstream device based on the first signal transmission frequency and the first signal transmission path among the signal transmission paths. Through switching the signal transmission path early before changing the signal transmission frequency, the equalizer calibration efficiency at the signal receiving end can be effectively improved during the period of adjusting the signal transmission frequency.

DETAILED DESCRIPTION OF DISCLOSED EMBODIMENTS

A number of exemplary embodiments are presented below to illustrate the disclosure, but the disclosure is not limited to the exemplary embodiments illustrated. Also, appropriate combinations are allowed between the exemplary embodiments. The term "coupling" used in the entire specification (including the claims) of the present application may refer to any direct or indirect connection means. For example, if it is according to the text that a first device is coupled to a second device, it should be interpreted as that the first device may be directly connected to the second device, or the first device may be indirectly connected to the second device through other devices or certain connection means. In addition, the term "signal" may refer to one or more signals of at least one current, voltage, charge, temperature, data, or others.

Figure 1:
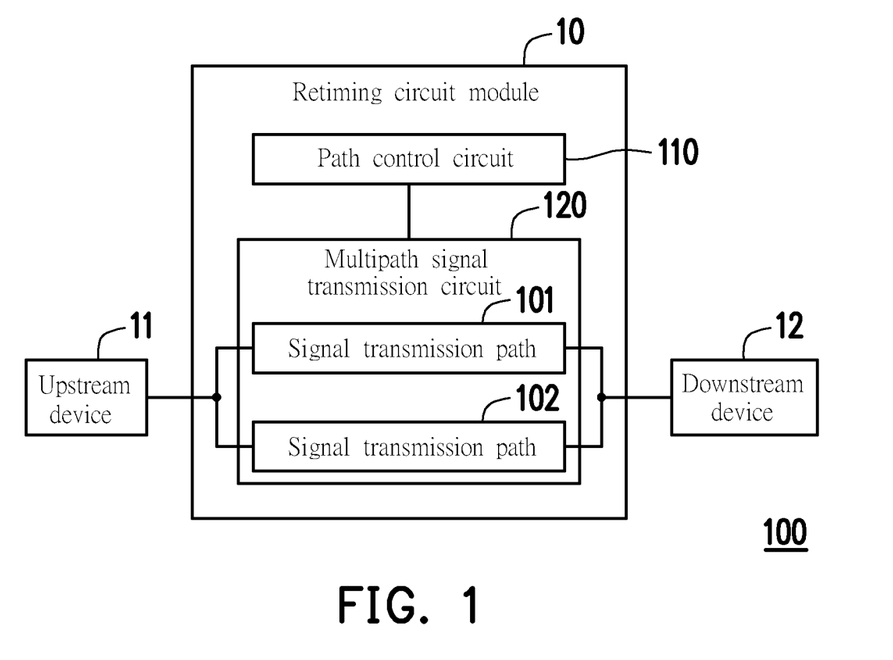
FIG. 1 is a schematic diagram of a signal transmission system according to an exemplary embodiment of the disclosure.

FIG. 1 is a schematic diagram of a signal transmission system according to an exemplary embodiment of the disclosure. Please refer to FIG. 1. A signal transmission system 100 includes a retiming circuit module 10, an upstream device 11, and a downstream device 12. The retiming circuit module 10 is adapted to be coupled between the upstream device 11 and the downstream device 12 to perform signal transmission between the upstream device 11 and the downstream device 12 (that is, to send a signal received from the upstream device 11 to the downstream device 12 or to send a signal received from the downstream device 12 to the upstream device 11). For example, the retiming circuit module 10 may include a retimer or a circuit module with similar functions. For example, the upstream device 11 and the downstream device 12 may include any electronic components that support the signal transmission function.

In an exemplary embodiment, the retiming circuit module 10 may be configured to perform signal processing such as signal buffering, signal resampling, signal serial to parallel (S2P), signal content analysis, signal content modification, and signal retransmission to extend a signal transmission distance between the upstream device 11 and the downstream device 12 and/or improve the signal transmission quality between the upstream device 11 and the downstream device 12. In addition, the retiming circuit module 10, the upstream device 11, and the downstream device 12 may be disposed on one or more circuit boards.

The retiming circuit module 10 may include a path control circuit 110 and a multipath signal transmission circuit 120. The path control circuit 110 is coupled to the multipath signal transmission circuit 120. The multipath signal transmission circuit 120 may include a signal transmission path (also referred to as a first signal transmission path) 101 and a signal transmission path (also referred to as a second signal transmission path) 102. The path control circuit 110 may indicate the multipath signal transmission circuit 120 to perform the signal transmission between the upstream device 11 and the downstream device 12 based on one of the signal transmission paths 101 and 102 at different time points.

In an exemplary embodiment, the signal delay of the signal transmission path 101 may be higher than the signal delay of the signal transmission path 102. Therefore, the signal transmission path 101 is also referred to as a long latency path or a data analysis path, and the signal transmission path 102 is also referred to as a short latency path relative to the signal transmission path 101. In an exemplary embodiment, the signal delay of the signal transmission path 101 is higher than the signal delay of the signal transmission path 102, which represents that the signal transmission speed of the signal transmission path 101 is lower than the signal transmission speed of the signal transmission path 102.

In an exemplary embodiment, the signal transmission path 101 is a parallel signal transmission path, and the signal transmission path 102 is a serial signal transmission path. For example, the signal transmission path 101 may include multiple parallel signal transmission channels to perform parallel signal transmission. The signal transmission path 102 contains only a single signal transmission channel, and cannot perform the parallel signal transmission.

In an exemplary embodiment, the signal transmission paths 101 and 102 are both parallel signal transmission paths. For example, the signal transmission path 101 may include multiple first parallel signal transmission channels, the signal transmission path 102 may include multiple second parallel signal transmission channels, and the signal transmission paths 101 and 102 may both perform the parallel signal transmission. The total number of first parallel signal transmission channels may be the same as or different from the total number of second parallel signal transmission channels.

Figure 2:
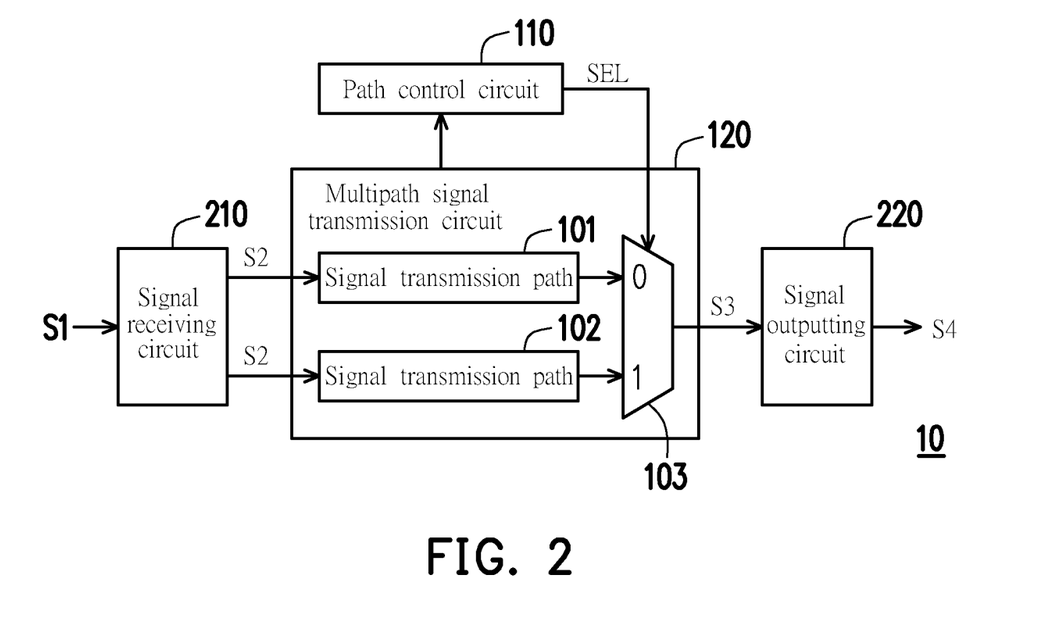
FIG. 2 is a schematic diagram of a retiming circuit module according to an exemplary embodiment of the disclosure.

FIG. 2 is a schematic diagram of a retiming circuit module according to an exemplary embodiment of the disclosure. Please refer to FIG. 1 and FIG. 2. The retiming circuit module 10 may include the path control circuit 110, the multipath signal transmission circuit 120, a signal receiving circuit 210, and a signal outputting circuit 220. The signal receiving circuit 210 is coupled to an input end of the multipath signal transmission circuit 120. The signal outputting circuit 220 is coupled to an output end of the multipath signal transmission circuit 120.

The signal receiving circuit 210 may receive a signal (also referred to as a first signal) S1 and output a signal (also referred to as a second signal) S2. The signal S1 may include a signal issued by the upstream device 11 and intended to be sent to the downstream device 12 or a signal issued by the downstream device 12 and intended to be sent to the upstream device 11.

The multipath signal transmission circuit 120 may include a multiplexer circuit 103. The multiplexer circuit 103 is coupled to the path control circuit 110, the signal transmission path 101, the signal transmission path 102, and the signal outputting circuit 220. The path control circuit 110 may control the multiplexer circuit 103 to turn on one of the signal transmission paths 101 and 102. For example, the multiplexer circuit 103 may send a signal (also referred to as a selection signal) SEL to the multiplexer circuit 103. The multiplexer circuit 103 may turn on the signal transmission path 101 or 102 in response to the signal SEL. The signal transmission path that is turned on may be regarded as a target signal transmission path. For example, assuming that the target signal transmission path is the signal transmission path 101, at least one signal channel in the signal transmission path 101 may be configured to receive the signal S2 and output a signal S3. Alternatively, assuming that the target signal transmission path is the signal transmission path 102, at least one signal channel in the signal transmission path 102 may be configured to receive the signal S2 and output the signal S3.

The multipath signal transmission circuit 120 may receive the signal S2 from the signal receiving circuit 210 based on the target signal transmission path and output the signal (also referred to as a third signal) S3. For example, the multiplexer circuit 103 may receive the signal S3 from one of the signal transmission paths 101 and 102 and transmit the signal S3 to the signal outputting circuit 220.

The signal outputting circuit 220 may receive the signal S3 from the multipath signal transmission circuit 120 and output a signal (also referred to as a fourth signal) S4. For example, assuming that the signal S1 is issued by the upstream device 11, the signal S4 output according to the signal S1 will be transmitted to the downstream device 12. Alternatively, assuming that the signal S1 is issued by the downstream device 12, the signal S4 output according to the signal S1 will be transmitted to the upstream device 11.

In an exemplary embodiment, the total number of circuits (and/or circuit complexity) on the signal transmission path 101 may be higher than the total number of circuits (and/or circuit complexity) on the signal transmission path 102. Therefore, the signal delay of the signal transmission path 101 may be higher than the signal delay of the signal transmission path 102.

In an exemplary embodiment, a circuit on the signal transmission path 101 may be configured to analyze and adjust the signal transmitted via the signal transmission path 101. In an exemplary embodiment, a circuit on the signal transmission path 102 may be configured to buffer the signal transmitted via the signal transmission path 102, but cannot perform the analysis and adjustment of the signal.

Figure 3:
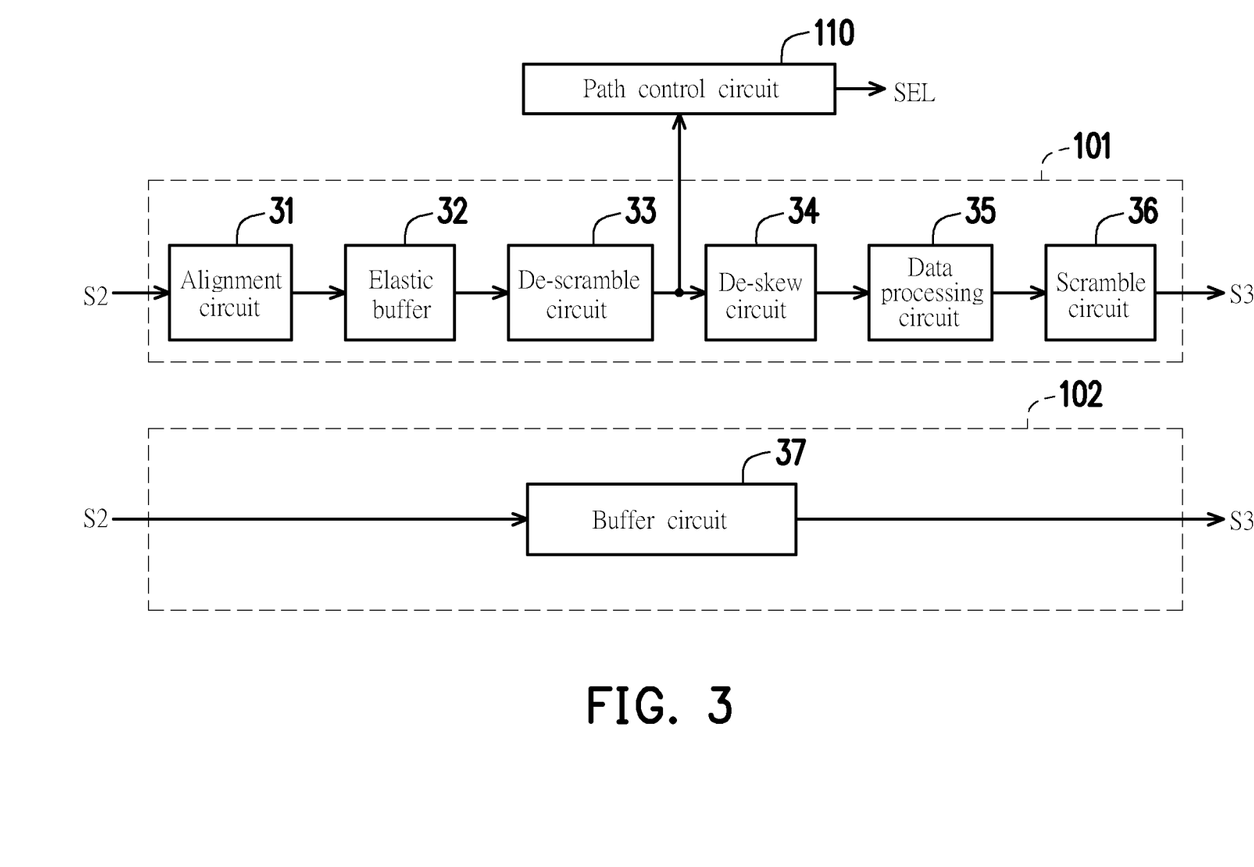
FIG. 3 is a schematic diagram of a first signal transmission path and a second signal transmission path according to an exemplary embodiment of the disclosure.

FIG. 3 is a schematic diagram of a first signal transmission path and a second signal transmission path according to an exemplary embodiment of the disclosure. Please refer to FIG. 3. Circuits (also referred to as processing circuits) on the signal transmission path 101 may include an alignment circuit 31, an elastic buffer 32, a de-scramble circuit 33, a de-skew circuit 34, a data processing circuit 35, and a scramble circuit 36. The alignment circuit 31, the elastic buffer 32, the de-scramble circuit 33, the de-skew circuit 34, the data processing circuit 35, and the scramble circuit 36 may be coupled to the signal transmission path 101 and configured to analyze and process a signal transmitted via the signal transmission path 101. That is, the signal S2 may be analyzed and/or processed, such as performing signal alignment, buffering, de-scrambling, de-skewing, signal content analysis, signal content modification and/or scrambling, by at least one of the circuits 31 to 36 when passing through the signal transmission path 101. The signal S3 may be output at an output end of the signal transmission path 101. In addition, the total number and types of circuits 31 to 36 may be adjusted according to practical requirements, which is not limited in the disclosure.

On the other hand, a circuit on the signal transmission path 102 may include a circuit (also referred to as a buffer circuit) 37. The buffer circuit 37 is coupled to the signal transmission path 102 and is configured to buffer a signal transmitted via the signal transmission path 102. For example, the signal S2 may be buffered in the buffer circuit 37 when passing through the signal transmission path 102, and the signal S3 may then be output at an output end of the signal transmission path 102. In addition, the total number and types of circuits 37 may be adjusted according to practical requirements, which is not limited in the disclosure.

In an exemplary embodiment, the path control circuit 110 may be coupled to the signal transmission path 101 and send the signal SEL according to the signal transmitted on the signal transmission path 101 to switch the target signal transmission path. For example, the path control circuit 110 may be coupled to an output end of the de-scramble circuit 33 and generate the signal SEL according to an output of the de-scramble circuit 33.

In an exemplary embodiment, the upstream device 11 and the downstream device 12 may transmit a signal to each other based on different signal transmission frequencies (for example, 2.5 GT/s, 8 GT/s, 16 GT/s, and/or 32 GT/s). During a period of changing the signal transmission frequency, the path control circuit 110 may switch the target signal transmission path.

Figure 4:
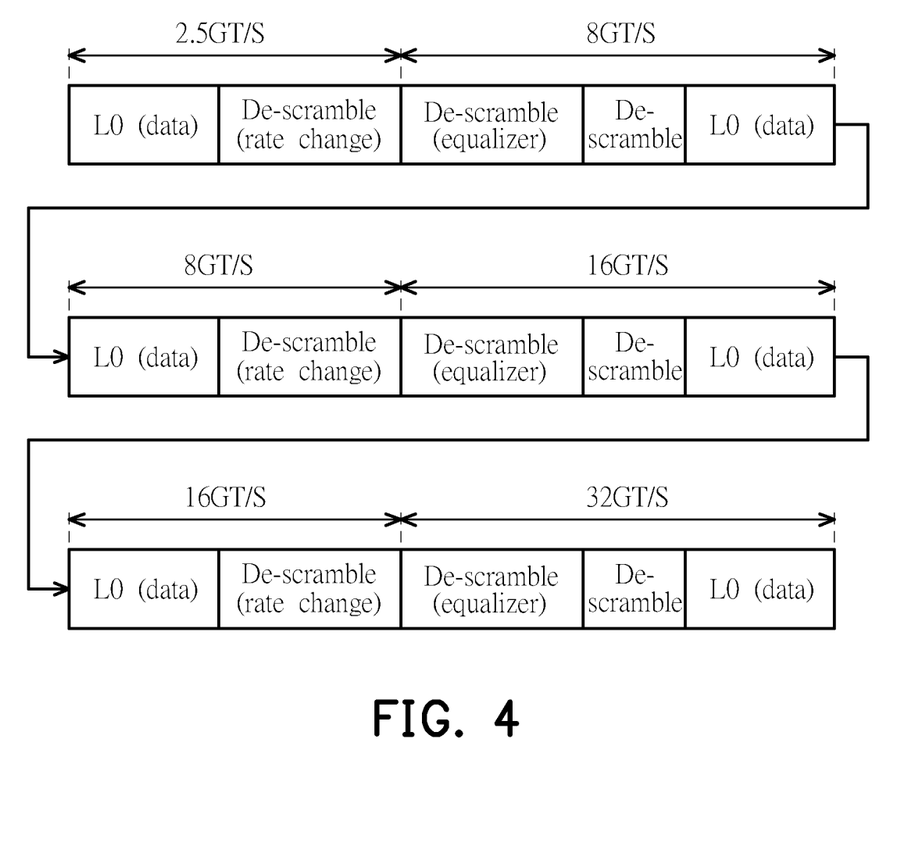
FIG. 4 is a schematic diagram of adjusting a signal transmission frequency according to an exemplary embodiment of the disclosure.

FIG. 4 is a schematic diagram of adjusting a signal transmission frequency according to an exemplary embodiment of the disclosure. Please refer to FIG. 4. It is assumed that the signal transmission frequency between the upstream device 11 and the downstream device 12 is gradually increased from 2.5 GT/s to 32 GT/s. During periods of changing the signal transmission frequency from 2.5 GT/s to 8 GT/s, from 8 GT/s to 16 GT/s, and from 16 GT/s to 32 GT/s, a signal transmission link between the upstream device 11 and the downstream device 12 may be sequentially in an L0 state (that is, a normal data transmission state), a de-scramble state for changing a transmission rate, a de-scramble state for equalizer calibration, an overall de-scramble state, and the L0 state after completing link handshake. The L0 state and the de-scramble state for changing the transmission rate are operated at a previous signal transmission frequency (for example, 2.5 GT/s), and the de-scramble state for the equalizer calibration, the overall de-scramble state, and the L0 state after completing the link handshake are operated at a new signal transmission frequency (for example, 8 GT/s).

Figure 5:
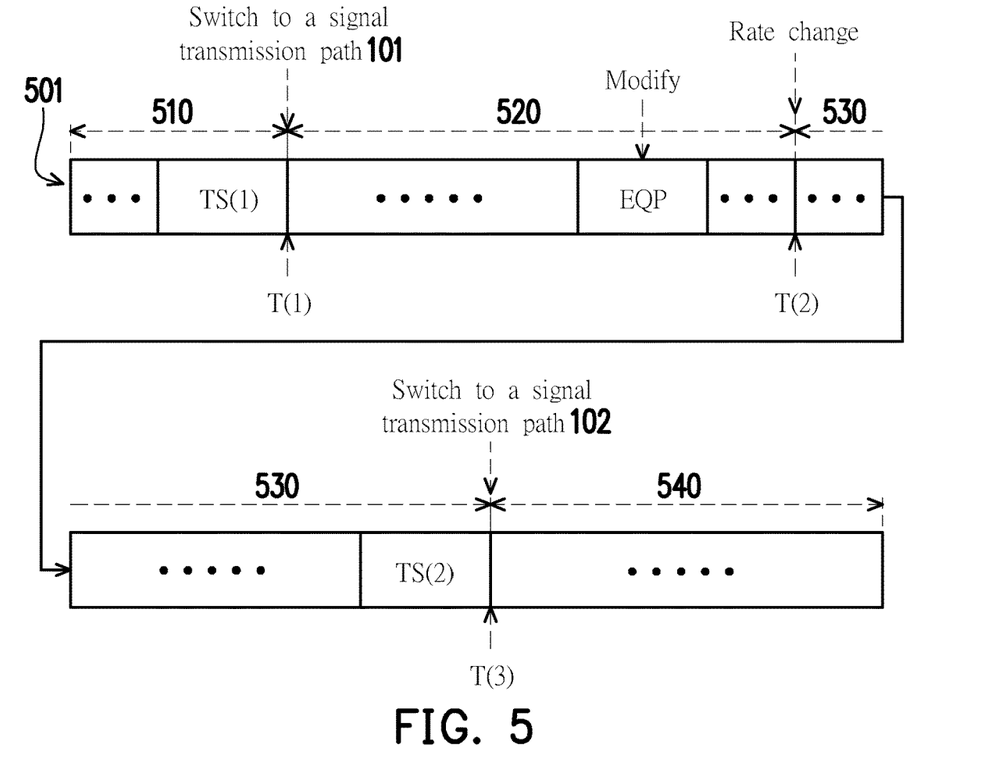
FIG. 5 is a schematic diagram of switching a signal transmission path during a period of changing a signal transmission frequency according to an exemplary embodiment of the disclosure.

FIG. 5 is a schematic diagram of switching a signal transmission path during a period of changing a signal transmission frequency according to an exemplary embodiment of the disclosure. Please refer to FIG. 1, FIG. 2, and FIG. 5. A signal 501 is configured to represent a signal transmitted between the upstream device 11 and the downstream device 12. During a signal transmission period 510, the path control circuit 110 may set the target signal transmission path to the low latency signal transmission path 102. During the signal transmission period 510, the multipath signal transmission circuit 120 may perform signal transmission (also referred to as first signal transmission) between the upstream device 11 and the downstream device 12 based on a specific signal transmission frequency (also referred to as a first signal transmission frequency) and the signal transmission path 102.

During the period of performing the first signal transmission (that is, the signal transmission period 510), the path control circuit 110 may detect a specific data sequence (also referred to as a first data sequence or a first training sequence) TS(1) transmitted between the upstream device 11 and the downstream device 12. For example, the data sequence TS(1) may carry information indicating the adjustment of the signal transmission frequency. For example, the data sequence TS(1) may contain at least one indicator bit whose bit value is "1" to indicate that the signal transmission frequency between the upstream device 11 and the downstream device 12 will be adjusted.

According to the data sequence TS(1), at a time point T(1), the path control circuit 110 may switch the target signal transmission path from the signal transmission path 102 to the signal transmission path 101. During a signal transmission period 520 after the time point T(1), the multipath signal transmission circuit 120 may perform signal transmission (also referred to as second signal transmission) between the upstream device 11 and the downstream device 12 based on the first signal transmission frequency and the signal transmission path 101.

Thereafter, at a time point T(2), a signal transmission frequency (that is, a signal transmission rate) between the upstream device 11 and the downstream device 12 changes. For example, during the signal transmission period 520, the upstream device 11 and the downstream device 12 transmit a signal based on a new signal transmission frequency (also referred to as a second signal transmission frequency). The second signal transmission frequency is different from the first signal transmission frequency. For example, assuming that the first signal transmission frequency is 2.5 GT/s, the second signal transmission frequency may be 8 GT/s. During a signal transmission period 530 after the time point T(2), the multipath signal transmission circuit 120 may perform signal transmission (also referred to as third signal transmission) between the upstream device 11 and the downstream device 12 based on the second signal transmission frequency and the signal transmission path 101.

During the third signal transmission period (the signal transmission period 530), the path control circuit 110 may detect a specific data sequence (also referred to as a second data sequence or a second training sequence) TS(2) transmitted between the upstream device 11 and the downstream device 12. For example, the data sequence TS(2) may carry information indicating the completion of the equalizer calibration. For example, the data sequence TS(2) may contain at least one indicator bit whose bit value is "0" to indicate that an equalizer calibration phase between the upstream device 11 and the downstream device 12 has been completed.

According to the data sequence TS(2), at a time point T(3), the path control circuit 110 may switch the target signal transmission path from the signal transmission path 101 back to the low latency signal transmission path 102. During a signal transmission period 540 after the time point T(3), the multipath signal transmission circuit 120 may perform signal transmission (also referred to as fourth signal transmission) between the upstream device 11 and the downstream device 12 based on the second signal transmission frequency and the signal transmission path 102. So far, a single change operation of the signal transmission frequency (for example, changing the signal transmission frequency from 2.5 GT/s to 8 GT/s, from 8 GT/s to 16 GT/s, or from 16 GT/s to 32 GT/s) between the upstream device 11 and the downstream device 12 has been completed.

In an exemplary embodiment, regardless of whether the signal transmission path 101 or 102 is turned on, the circuits (for example, the circuits 31 to 36 in FIG. 3) on the signal transmission path 101 may all continue to be configured to analyze the signal S2 transmitted via the signal transmission path 101. In an exemplary embodiment, during the period of performing the first signal transmission (that is, the signal transmission period 510), the path control circuit 110 may detect the data sequence TS(1) via the signal transmission path 101. Similarly, during the period of performing the third signal transmission (that is, the signal transmission period 530), the path control circuit 110 may detect the data sequence TS(2) via the signal transmission path 101.

Taking FIG. 3 as an example, in an exemplary embodiment, the path control circuit 110 may detect the data sequence TS(1) and/or TS(2) according to the signal transmitted on the signal transmission path 101. For example, the path control circuit 110 may detect the data sequence TS(1) and/or TS(2) according to the output of the de-scramble circuit 33 (for example, analyze the output of the de-scramble circuit 33).

In an exemplary embodiment, during the period of performing the second signal transmission (that is, the signal transmission period 520), the multipath signal transmission circuit 120 may modify a specific data sequence (also referred to as a third data sequence) EQP transmitted via the signal transmission path 101. Then, the multipath signal transmission circuit 120 may output the modified data sequence EQP via the signal transmission path 101. For example, the data sequence EQP may carry setting information of an equalizer circuit (for example, setting parameters of the equalizer circuit) at a signal receiving end. For example, assuming that a signal currently in transmission is transmitted from the upstream device 11 to the downstream device 12, the signal receiving end is the downstream device 12. Alternatively, assuming that a signal currently in transmission is transmitted from the downstream device 12 to the upstream device 11, the signal receiving end is the upstream device 11. For example, the signal receiving end may calibrate the equalizer circuit according to the setting information. For example, in an exemplary embodiment, at least one of the upstream device 11 and the downstream device 12 may set the parameters of the equalizer circuit according to the modified data sequence EQP (or the setting information).

Taking FIG. 3 as an example, in an exemplary embodiment, the data processing circuit 35 may be configured to detect and modify the data sequence EQP transmitted via the signal transmission path 101. For example, the data processing circuit 35 may capture the data sequence EQP from a signal transmitted by the signal transmission path 101. According to device information (for example, a device type and/or a device model) of the signal receiving end, the data processing circuit 35 may modify (for example, optimize) the setting information of the equalizer circuit in the captured data sequence EQP. Then, the data processing circuit 35 may send the modified data sequence EQP to the signal receiving end via the signal transmission path 101.

In an exemplary embodiment, compared to the original data sequence EQP, the modified data sequence EQP may contain the setting information of the equalizer circuit that is more compliant with the requirements of the current signal receiving end, thereby effectively improving the efficiency of performing the equalizer calibration at the signal receiving end. For example, assuming that the original data sequence EQP indicates the signal receiving end to perform testing and calibration from a first set of setting parameters of the equalizer circuit, but in fact the optimal setting parameters of the equalizer circuit for the adjusted signal transmission frequency (that is, the second signal transmission frequency) at the signal receiving end are obviously not the first set of setting parameters. Therefore, the modified data sequence EQP may indicate the signal receiving end to start calibrating the equalizer circuit or perform other optimized calibration procedures from an n-th set of setting parameters (where n is greater than 1) (that is, skipping the first set of setting parameters).

In addition, in the exemplary embodiment of FIG. 5, the target signal transmission path is switched to the signal transmission path 101 early before changing the signal transmission frequency, and calibration parameters of the optimized equalizer circuit may also be provided to the signal receiving end early. In this way, the equalizer calibration efficiency at the signal receiving end can be effectively improved during the period of adjusting the signal transmission frequency.

It should be noted that the settings and coupling manner of all circuits in the retiming circuit module 10 mentioned in the above exemplary embodiment are only examples and are not intended to limit the disclosure. In some exemplary embodiments, the settings and coupling manners of all circuits in the retiming circuit module 10 may be adjusted according to practical requirements. In addition, in some exemplary embodiments, more useful circuits and/or electronic components may be added to the retiming circuit module 10 or configured to replace specific circuits and/or electronic components in the retiming circuit module 10, depending on practical requirements.

It should be noted that the retiming circuit module 10 may contain a combination of multiple sets of the path control circuits 110 and the multipath signal transmission circuit 120 to be responsible for processing and transmitting signals in different transmission directions. For example, a combination of one set of the path control circuits 110 and the multipath signal transmission circuit 120 in the retiming circuit module 10 may be responsible for processing and transmitting a signal transmitted from the upstream device 11 to the downstream device 12, and a combination of another set of the path control circuits 110 and the multipath signal transmission circuit 120 in the retiming circuit module 10 may be responsible for processing and transmitting a signal transmitted from the downstream device 12 to the upstream device 11.

Figure 6:
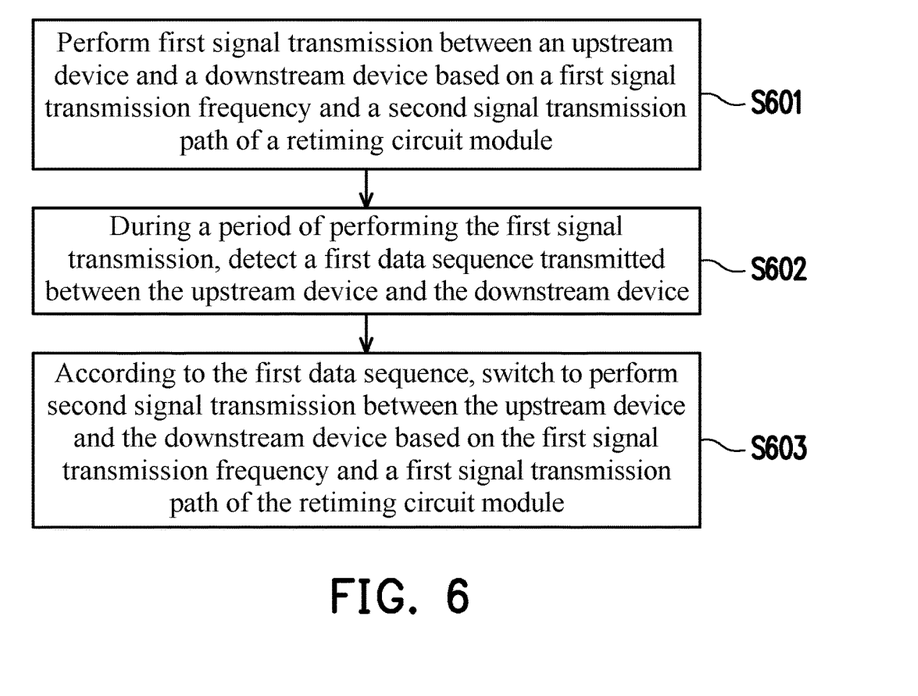
FIG. 6 is a flowchart of a signal transmission method according to an exemplary embodiment of the disclosure.

FIG. 6 is a flowchart of a signal transmission method according to an exemplary embodiment of the disclosure. Please refer to FIG. 6. In Step S601, first signal transmission between an upstream device and a downstream device is performed based on a first signal transmission frequency and a second signal transmission path among multiple signal transmission paths of a retiming circuit module. In Step S602, during a period of performing the first signal transmission, a first data sequence transmitted between the upstream device and the downstream device is detected. In Step S603, according to the first data sequence, second signal transmission between the upstream device and the downstream device is switched to be performed based on the first signal transmission frequency and a first signal transmission path among the signal transmission paths.

It should be noted that each step in FIG. 6 may be implemented as multiple program codes or circuits, which is not limited in the disclosure. In addition, the method in FIG. 6 may be used in conjunction with the above exemplary embodiments or may be used alone, which is not limited in the disclosure.

In summary, in the exemplary embodiments of the disclosure, the signal transmission path between the upstream device and the downstream device may be switched to the long latency path before actually changing the signal transmission frequency to improve the equalizer calibration efficiency at the signal receiving end. In addition, after completing the equalizer calibration at the signal receiving end, the signal transmission path is quickly switched back to the short latency path. In this way, under the premise of reducing the signal transmission delay as much as possible, the exemplary embodiments of the disclosure can effectively improve the equalizer calibration efficiency at the signal receiving end during the period of adjusting the signal transmission frequency.

Although the disclosure has been disclosed in the above embodiments, the embodiments are not intended to limit the disclosure. Persons skilled in the art may make some changes and modifications without departing from the spirit and scope of the disclosure. The protection scope of the disclosure shall be defined by the appended claims.

What is claimed is:

1. A retiming circuit module, adapted to perform signal transmission between an upstream device and a downstream device, the retiming circuit module comprising:
   a path control circuit; and
   a multipath signal transmission circuit, coupled to the path control circuit, wherein
   the multipath signal transmission circuit has built-in first signal transmission path and second signal transmission path,
   the multipath signal transmission circuit is configured to perform first signal transmission between the upstream device and the downstream device based on a first signal transmission frequency and the second signal transmission path,
   during a period of performing the first signal transmission, the path control circuit is configured to detect a first data sequence transmitted between the upstream device and the downstream device, and
   the path control circuit is further configured to control the multipath signal transmission circuit to switch to perform second signal transmission between the upstream device and the downstream device based on the first signal transmission frequency and the first signal transmission path according to the first data sequence,
   wherein a signal delay of the first signal transmission path is higher than a signal delay of the second signal transmission path.

2. The retiming circuit module according to claim 1, wherein the first data sequence carries information indicating adjustment of signal transmission frequency.

3. The retiming circuit module according to claim 1, wherein after performing the second signal transmission, the multipath signal transmission circuit is further configured to switch to perform third signal transmission between the upstream device and the downstream device based on a second signal transmission frequency and the first signal transmission path, and the second signal transmission frequency is different from the first signal transmission frequency.

4. The retiming circuit module according to claim 3, wherein during a period of performing the third signal transmission, the path control circuit is further configured to detect a second data sequence transmitted between the upstream device and the downstream device, and
   the path control circuit is further configured to control the multipath signal transmission circuit to switch to perform fourth signal transmission between the upstream device and the downstream device based on the second signal transmission frequency and the second signal transmission path according to the second data sequence.

5. The retiming circuit module according to claim 4, wherein the second data sequence carries information indicating completion of equalizer calibration.

6. The retiming circuit module according to claim 1, further comprising:

a data processing circuit, coupled to the first signal transmission path, wherein during a period of performing the second signal transmission, the data processing circuit is configured to modify a third data sequence transmitted via the first signal transmission path, and the multipath signal transmission circuit is further configured to output the modified third data sequence via the first signal transmission path.

7. The retiming circuit module according to claim 6, wherein the third data sequence carries setting information of an equalizer circuit.

8. The retiming circuit module according to claim 6, wherein at least one of the upstream device and the downstream device is configured to set parameters of an equalizer circuit according to the modified third data sequence.

9. The retiming circuit module according to claim 1, wherein the multipath signal transmission circuit further comprises:

a multiplexer circuit, coupled to the path control circuit and a plurality of signal transmission paths, wherein the multiplexer circuit is configured to turn on one of the signal transmission paths according to indication of the path control circuit.

10. The retiming circuit module according to claim 1, wherein the retiming circuit module further comprises:

a signal receiving circuit, coupled to an input end of the multipath signal transmission circuit; and a signal outputting circuit, coupled to an output end of the multipath signal transmission circuit, wherein the signal receiving circuit is configured to receive a first signal and output a second signal, the path control circuit is further configured to turn on one of the signal transmission paths as a target signal transmission path, the multipath signal transmission circuit is further configured to receive the second signal from the signal receiving circuit based on the target signal transmission path and output a third signal, and the signal outputting circuit is further configured to receive the third signal from the multipath signal transmission circuit and output a fourth signal.

11. The retiming circuit module according to claim 1, wherein the multipath signal transmission circuit comprises:

a plurality of processing circuits, coupled to the first signal transmission path and configured to analyze and process a signal transmitted via the first signal transmission path; and at least one buffer circuit, coupled to the second signal transmission path and configured to buffer a signal transmitted via the second signal transmission path.

12. The retiming circuit module according to claim 1, wherein the first signal transmission path is a parallel signal transmission path, and the second signal transmission path is a serial signal transmission path.

13. The retiming circuit module according to claim 1, wherein the first signal transmission path and the second signal transmission path are both parallel signal transmission paths.

14. A signal transmission system, comprising:

an upstream device;

a downstream device; and a retiming circuit module, coupled between the upstream device and the downstream device to perform signal transmission between the upstream device and the downstream device, wherein the retiming circuit module comprises a plurality of signal transmission paths, the retiming circuit module is configured to perform first signal transmission between the upstream device and the downstream device based on a first signal transmission frequency and a second signal transmission path among the signal transmission paths, during a period of performing the first signal transmission, the retiming circuit module is further configured to detect a first data sequence transmitted between the upstream device and the downstream device, and the retiming circuit module is further configured to switch to perform second signal transmission between the upstream device and the downstream device based on the first signal transmission frequency and a first signal transmission path among the signal transmission paths according to the first data sequence, wherein a signal delay of the first signal transmission path is higher than a signal delay of the second signal transmission path.

15. The signal transmission system according to claim 14, wherein the first data sequence carries information indicating adjustment of signal transmission frequency.

16. The signal transmission system according to claim 14, wherein after performing the second signal transmission, the retiming circuit module is further configured to switch to perform third signal transmission between the upstream device and the downstream device based on a second signal transmission frequency and the first signal transmission path, and the second signal transmission frequency is different from the first signal transmission frequency.

17. The signal transmission system according to claim 14, wherein during a period of performing the third signal transmission, the retiming circuit module is further configured to detect a second data sequence transmitted between the upstream device and the downstream device, and the retiming circuit module is further configured to switch to perform fourth signal transmission between the upstream device and the downstream device based on the second signal transmission frequency and the second signal transmission path according to the second data sequence.

18. The signal transmission system according to claim 17, wherein the second data sequence carries information indicating completion of equalizer calibration.

19. The signal transmission system according to claim 14, wherein during a period of performing the second signal transmission, the retiming circuit module is further configured to modify a third data sequence transmitted via the first signal transmission path, and the multipath signal transmission circuit is further configured to output the modified third data sequence via the first signal transmission path.

20. The signal transmission system according to claim 19, wherein the third data sequence carries setting information of an equalizer circuit.

21. The signal transmission system according to claim 19, wherein at least one of the upstream device and the downstream device is configured to set parameters of an equalizer circuit according to the modified third data sequence.

22. The signal transmission system according to claim 14, wherein the retiming circuit module comprises:

a path control circuit; and a multiplexer circuit, coupled to the path control circuit, wherein the multiplexer circuit is configured to turn on one of the signal transmission paths according to indication of the path control circuit.

23. The signal transmission system according to claim 14, wherein the retiming circuit module comprises:
   a path control circuit;
   a multipath signal transmission circuit, coupled to the path control circuit;
   a signal receiving circuit, coupled to an input end of the multipath signal transmission circuit; and
   a signal outputting circuit, coupled to an output end of the multipath signal transmission circuit, wherein
   the multipath signal transmission circuit comprises the signal transmission paths,
   the signal receiving circuit is configured to receive a first signal and output a second signal,
   the path control circuit is configured to turn on one of the signal transmission paths as a target signal transmission path,
   the multipath signal transmission circuit is configured to receive the second signal from the signal receiving circuit based on the target signal transmission path and output a third signal, and
   the signal outputting circuit is further configured to receive the third signal from the multipath signal transmission circuit and output a fourth signal.

24. The signal transmission system according to claim 14, wherein the retiming circuit module comprises:
   a plurality of processing circuits, coupled to the first signal transmission path and configured to analyze and process a signal transmitted via the first signal transmission path; and
   at least one buffer circuit, coupled to the second signal transmission path and configured to buffer a signal transmitted via the second signal transmission path.

25. The signal transmission system according to claim 14, wherein the first signal transmission path is a parallel signal transmission path, and the second signal transmission path is a serial signal transmission path.

26. The signal transmission system according to claim 14, wherein the first signal transmission path and the second signal transmission path are both parallel signal transmission paths.

27. A signal transmission method for a retiming circuit module, wherein the retiming circuit module adapted to perform signal transmission between an upstream device and a downstream device, the retiming circuit module comprising a path control circuit, and a multipath signal transmission circuit, wherein the multipath signal transmission circuit has built-in first signal transmission path and second signal transmission path, the signal transmission method comprising:
   performing first signal transmission between the upstream device and the downstream device based on a first signal transmission frequency and the second signal transmission path through the multipath signal transmission circuit;
   during a period of performing the first signal transmission, detecting a first data sequence transmitted between the upstream device and the downstream device through the path control circuit; and
   switching to perform second signal transmission between the upstream device and the downstream device based on the first signal transmission frequency and the first signal transmission path according to the first data sequence through the multipath signal transmission circuit controlled by the path control circuit,
   wherein a signal delay of the first signal transmission path is higher than a signal delay of the second signal transmission path.

\* \* \* \* \*